(12) United States Patent
Borges Filho et al.

(10) Patent No.: US 9,884,542 B2
(45) Date of Patent: Feb. 6, 2018

(54) VERTICAL SEALING ARRANGEMENT BETWEEN DOORS WITHOUT SIDE PILLARS

(71) Applicant: FCA FIAT CHRYSLER AUTOMÓVEIS BRASIL LTDA., Betim-Minas Gerais (BR)

(72) Inventors: Aroldo Gaspar Borges Filho, Betim-Minas Gerais (BR); Guilherme Ferreira Sette Bicalho, Betim-Minas Gerais (BR); Marcelo Ferreira Pereira, Betim-Minas Gerais (BR); Anderson Seixas Malta Da Silva, Betim-Minas Gerais (BR)

(73) Assignee: FCA FIAT CHRYSLER AUTOMOVEIS BRASIL LTDA., Minas Gerais (BR)

( * ) Notice: Subject to any disclaimer, the term of this patent is extended or adjusted under 35 U.S.C. 154(b) by 14 days.

(21) Appl. No.: 15/030,482

(22) PCT Filed: Jan. 30, 2015

(86) PCT No.: PCT/BR2015/000012
§ 371 (c)(1),
(2) Date: Apr. 19, 2016

(87) PCT Pub. No.: WO2015/117211
PCT Pub. Date: Aug. 13, 2015

(65) Prior Publication Data
US 2016/0250912 A1    Sep. 1, 2016

(30) Foreign Application Priority Data

Feb. 7, 2014  (BR) .............................. 102014002997
Dec. 18, 2014  (BR) .............................. 132014031763

(51) Int. Cl.
*B60J 10/08*   (2006.01)
*B60J 10/25*   (2016.01)
(Continued)

(52) U.S. Cl.
CPC ............... *B60J 10/25* (2016.02); *B60J 10/15* (2016.02); *B60J 10/23* (2016.02); *B60J 10/248* (2016.02); *B60J 10/86* (2016.02)

(58) Field of Classification Search
CPC ..... B62D 25/04; B60R 21/213; B60R 21/232; B60R 13/025; F25D 2323/021;
(Continued)

(56) References Cited

U.S. PATENT DOCUMENTS

| 4,492,405 A | 1/1985 | Chikaraishi et al. |
| 4,998,946 A * | 3/1991 | Nozaki ................. E06B 7/2309 49/496.1 |

(Continued)

FOREIGN PATENT DOCUMENTS

| CN | 201712450 U | 1/2011 |
| DE | 40 29 091 A1 | 3/1992 |

(Continued)

OTHER PUBLICATIONS

English Abstract of CN 201712450 U.
(Continued)

*Primary Examiner* — Kiran B Patel
(74) *Attorney, Agent, or Firm* — Ladas & Parry LLP

(57) ABSTRACT

A vertical sealing arrangement to be used between doors of utility motor vehicles of various types, such as pickups, trucks, SUVs, sedans, hatchbacks and the like with front and rear doors without the side pillar, the so-called B pillar, is formed by two moldings, the top collector and the bottom discharger, which are interconnected by an extruded profile having at least one hollow longitudinal cavity the lumen of
(Continued)

which interconnects the inside volume of the collector to the inside volume of the discharger, thus defining a flow path for water and dust deposited on the upper part of the vehicle down to the lower part of the vehicle.

19 Claims, 2 Drawing Sheets

(51) Int. Cl.
  *B60J 10/86* (2016.01)
  *B60J 10/15* (2016.01)
  *B60J 10/23* (2016.01)
  *B60J 10/248* (2016.01)

(58) Field of Classification Search
  CPC .......... B60J 10/24; B60J 10/265; B60J 10/86; B60Q 1/268; B60Q 1/323
  USPC ............................................ 296/146.9, 146.1
  See application file for complete search history.

(56) References Cited

U.S. PATENT DOCUMENTS

| | | | | |
|---|---|---|---|---|
| 5,527,583 | A * | 6/1996 | Nozaki | B60J 10/35 296/146.9 |
| 5,590,926 | A * | 1/1997 | Nozaki | B60J 10/248 156/71 |
| 6,641,205 | B1 * | 11/2003 | Russell | B60J 10/80 296/146.9 |
| 6,686,020 | B2 * | 2/2004 | Sakuma | B29C 47/0066 428/122 |
| 8,205,391 | B2 | 6/2012 | Aritake et al. | |
| 2007/0113482 | A1 * | 5/2007 | Dumke | B60J 10/248 49/498.1 |
| 2009/0070960 | A1 * | 3/2009 | Elliott | E05D 3/127 16/334 |
| 2010/0095599 | A1 * | 4/2010 | Coldre | B60J 10/248 49/484.1 |
| 2012/0023830 | A1 * | 2/2012 | Bazzi | B60J 5/0479 49/484.1 |
| 2013/0047519 | A1 * | 2/2013 | Hooton | B60J 10/86 49/477.1 |
| 2014/0223830 | A1 * | 8/2014 | Shigehiro | E06B 7/23 49/495.1 |

FOREIGN PATENT DOCUMENTS

| | | |
|---|---|---|
| EP | 1 031 690 A1 | 8/2000 |
| EP | 1 346 864 A1 | 9/2003 |
| GB | 2 398 597 A | 8/2004 |
| JP | H 11314523 A | 11/1999 |
| JP | 2002-067701 A | 3/2002 |
| JP | 4110574 B2 | 4/2008 |
| JP | 4175044 B2 | 8/2008 |
| JP | 2009-255909 A | 11/2009 |
| JP | 2010-195077 A | 9/2010 |
| JP | 4769561 B2 | 6/2011 |
| WO | 2004/103749 A1 | 12/2004 |

OTHER PUBLICATIONS

English Abstract of DE 40 29 091 A1
English Abstract of EP 1 031 690 A1.
English Abstract of JP 2009-255909 A.
English Abstract of JP 2010-195077A.
English Abstract of JP 4110574 B2 also published as JP 2005-088810 (A) attached herewith.
English Abstract of JP 4769561 B2 also published as JP 2007-153189 (A) attached herewith.
English Abstract of JP 2002-067701 A.
English Abstract of JP 4175044 B2 also published as JP 2004-034824 (A) attached herewith.
English Abstract of JPH-11314523 A.
Supplementary European Search Report (SESR) dated Jun. 12, 2017 for Application No. EP 15 74 6675.

* cited by examiner

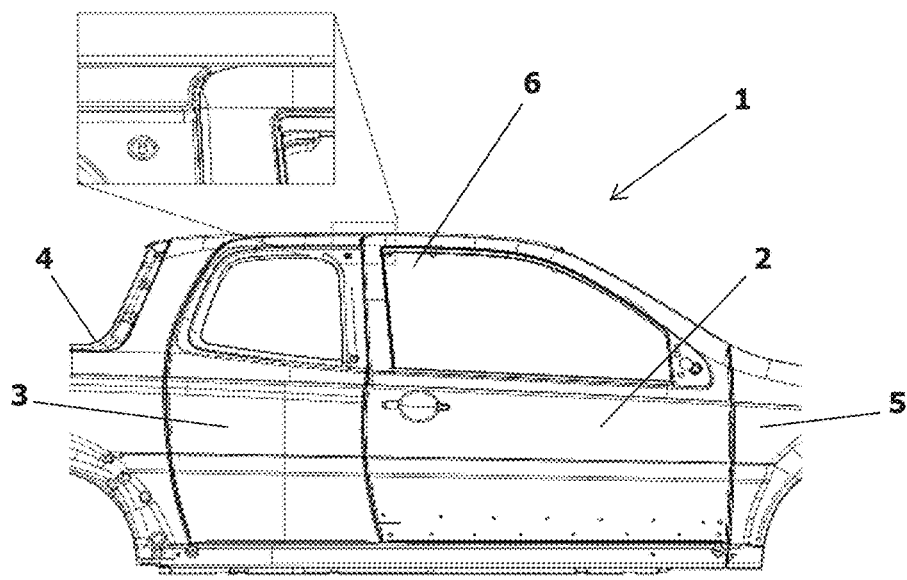
*Figure 1*
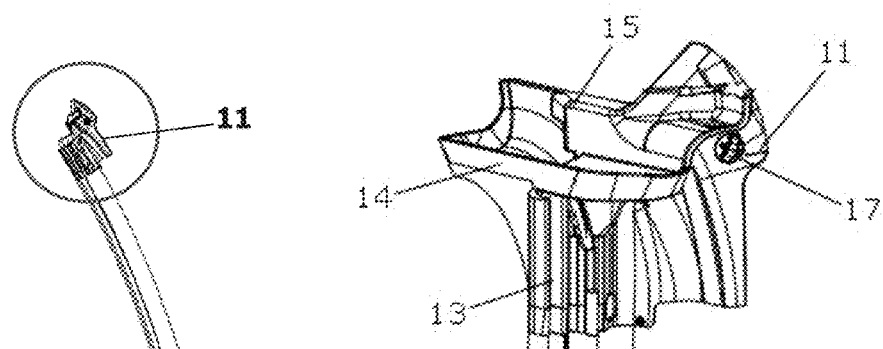
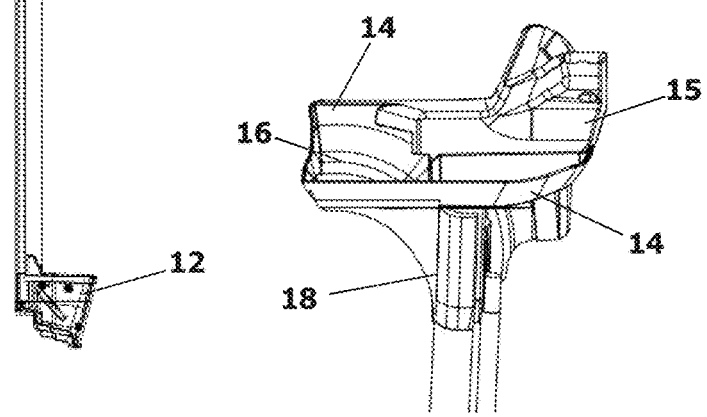
*Figure 2*
*Figure 2A*
*Figure 2B*

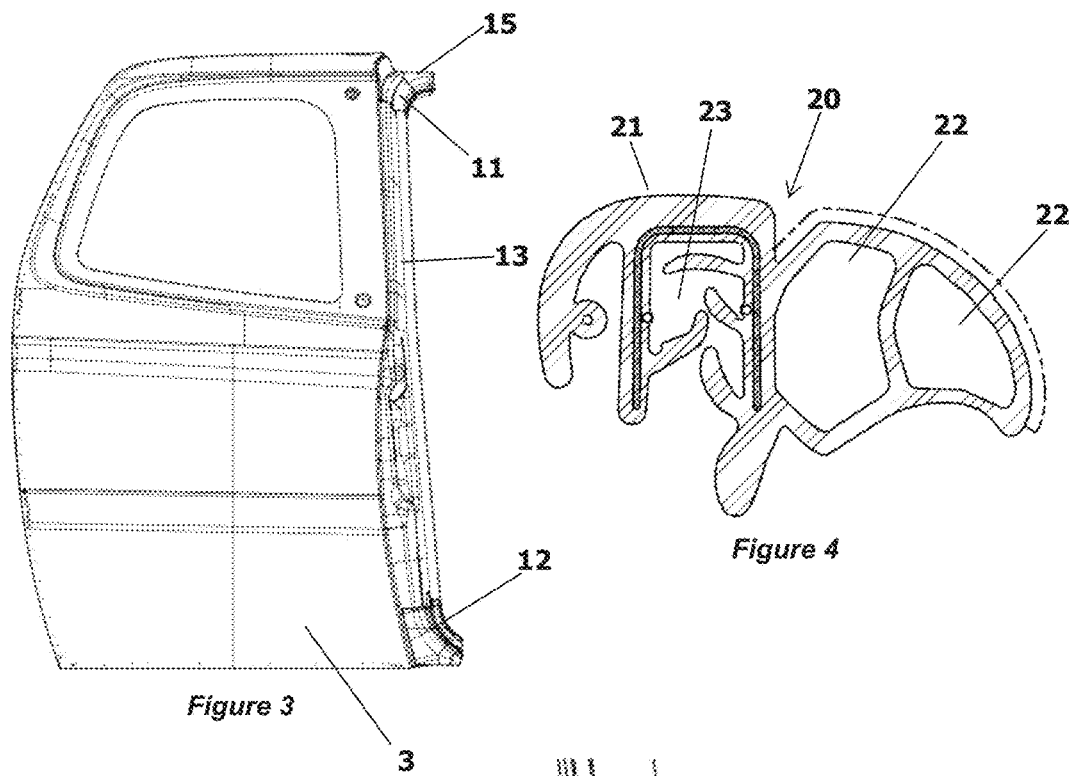
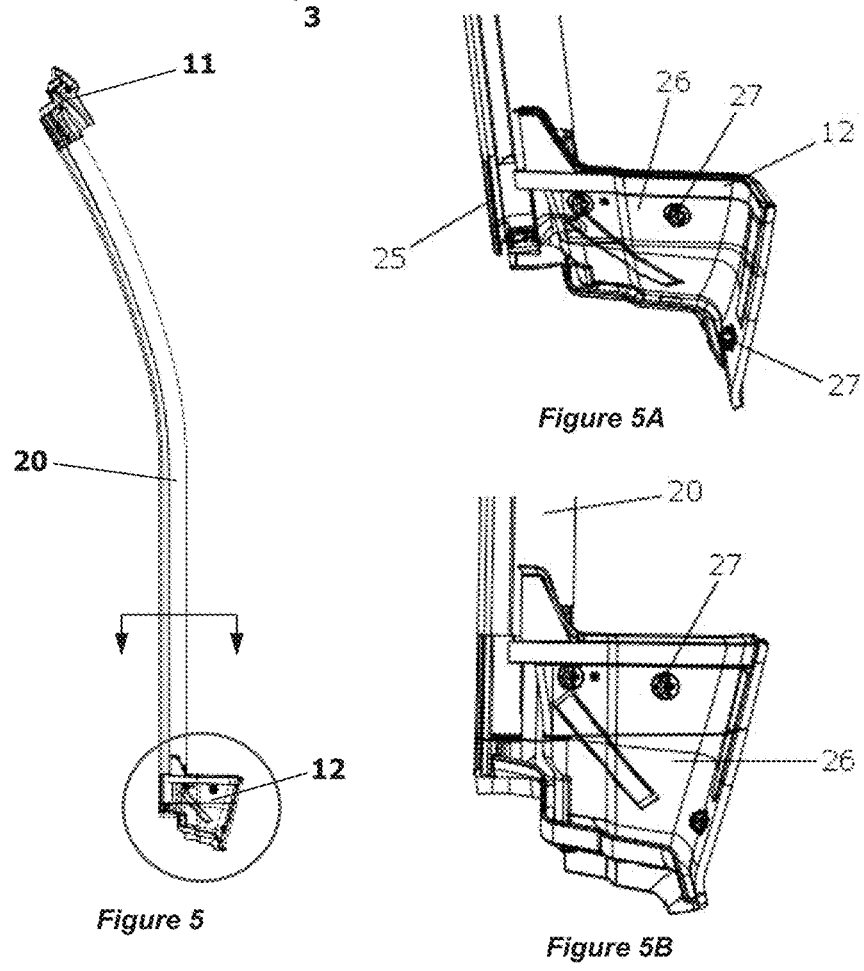

VERTICAL SEALING ARRANGEMENT BETWEEN DOORS WITHOUT SIDE PILLARS

RELATED APPLICATION

This application is a national phase entry under 35 USC 371 of International Patent Application No. PCT/BR2015/000012 filed on 30 Jan. 2015, which claims priority from Brazilian BR 10 2014 002997-4 filed on 7 Feb. 2014, and Brazilian BR BR 13 2014 031763-4 filed on 18 Dec. 2014, the disclosures of which are incorporated in their entirety by reference in.

The present invention relates to a vertical sealing arrangement designed to be used without side pillar, so-called B-pillar, between the front and rear doors of a vehicle. More particularly, the present invention relates to a simple and efficient device, whose feature prevents the entry of water inside to the vehicle compartment, due to a sealing system.

STATE OF THE ART

Traditional vehicles, with more than two doors, have in its structural composition a side pillar, so-called B-pillar B, between the front and rear doors, which has a structural function in the vehicle.

Presently, there are available on the market vehicles with the same features in regard to the number of doors, but without having one of the side pillars. Such vehicles have rear doors with different systems than the conventional ones, being the doors those of reverse type in relation to the front door (also known as suicide door) or even those of sliding type. When there is no B-pillar, this can cause that such vehicles present failure in sealing the passenger compartment, since the side pillar itself helps on the sealing system in traditional vehicles. In said traditional vehicles, the B-pillar acts as a rigid surface on which are fixed sealing gaskets for the vehicle door; said gaskets are compressed by the door side surface against the B-pillar, thereby providing the compartment sealing in relation to the external environment of the vehicle. Alternatively, the gaskets may be fixed at the door in order to be pressed against the pillar, i.e., B-pillar, resulting in the same insulation and sealing effect.

Therefore, there is need to develop a sealing arrangement that, when there is no side pillar, could act as sealant element of the passenger compartment, driving out of the vehicle the excess of water, dust and other debris.

Accordingly, solutions are known in the art which are provided with a sealing element or gasket, generally made of elastomers and their derivatives, based on the simple contour of the door geometry, and having the function of acting on the vehicle compartment sealing. Nevertheless, said solutions require the side pillar as basis to achieve the desirable sealing features, since pillars act as barriers against said debris, thus becoming sealing system extensions.

Among the known solutions, can be cited the documents U.S. Pat. No. 8,205,391, JP 2009/255 909, JP 2010/195 077, JP 4110574, JP 4769561, JP 2002/067 701, JP 4175044 and JPH 11314523, disclosing sealing arrangements of elastomers and its derivatives used to seal the vehicle compartment from entering water, dust and other debris, besides having good performance in regard to vibrations and closing efforts.

OBJECTS OF THE INVENTION

It is a first object of the present invention to provide a simple and efficient device mounted on the rear doors, particularly in vehicles without B-pillar between the front and rear doors, enable to capture the excess of water in the transitional areas and conduct it outside of the vehicle, thus ensuring no infiltration of water and, consequently, of dust, keeping its other functions unchanged, such as sealing, acoustic comfort and it performance in regard to closing and vibration efforts.

It is a second object of the present invention to provide a sealing arrangement to be used in a vehicle rear doors, which is efficient to avoid infiltration of water and dust inside the vehicle passenger compartment and keeping its other functions unchanged, such as sealing, acoustic comfort and it performance in regard to closing and vibration efforts.

SUMMARY OF THE INVENTION

These and other objects of the invention are achieved by a vertical sealing arrangement between doors without side pillar or B-pillar for cargo automotive vehicles or other kind of vehicles, such pick-up, trucks, SUVs, sedans, hatchbacks and the like, wherein said sealing arrangement is provided by two moldings, a top collector and a bottom discharger (12), interconnected by an extruded profile, said extruded profile having at least one hollow longitudinal cavity, the lumen of which interconnects the inside volume of the collector to the inside volume of the discharger, thereby defining a flow path for the water and dust deposited on the upper part of the vehicle down to the lower part. In particular, said collector has a rectangular cross-section cup shape, comprising side walls and a converging structure circumscribing a slope and defining an open communicating bottom engageable to said extruded profile by means of a seat (18), whilst said discharger has the form of a shaped plate, complementary to, and defining with the front wall of the rear door a volume, and wherein said discharger is provided on its upper part with a seat for engagement with the extruded profile. The extruded profile has a longitudinal conformation following the door side profile in which said profile is installed, and said extruded profile comprises an elongated body structured by an U cross-section rigid core, said elongated body further comprising at least one hollow longitudinal cavity. Furthermore, said collector and said discharger are mounted on the door by means of pin buttons or screws, while said extruded profile is fixed to the rear door beginning from the elongated seat defined by the core. As result, the inner converging funnel shape volume of the collector, the lumen of the extruded profile longitudinal cavity and the diverging inner volume of the discharger, thereby, define an open and continuous path for the passage of water, dust and the like.

It is also described an automotive vehicle, comprising an engine compartment, a cargo area and a passenger compartment, at least one side of the passenger compartment having a front door and a rear door, of reverse or sliding type door, so that between the doors is not provided an structural pillar or B-pillar, said vehicle further comprising a sealing arrangement as described above.

In other words, the present invention relates to a vertical sealing arrangement designed for use in vehicles equipped with doors with no pillar therebetween. Said vertical sealing arrangement is formed by three regions, the upper region being formed by a rubber molding whose shape allows the water harvesting that could enter inside the vehicle, the central region formed by a bulb with a rubber conductive channel, driving the water to the bottom region formed by a molding rubber whose shape enables the water flow and the sealing of the vehicle interior.

The sealing arrangement is positioned between the doors wherein one must close over the other. The sealing arrangement, besides acting in perfect sealing assembly, also captures the water that could enter inside the vehicle, driving it to the bottom region and, subsequently, eliminating it, and, therefore, avoiding it from entering inside the vehicle, thus ensuring a complete seal assembly.

BRIEF DESCRIPTION OF THE FIGURES

The object of the present invention will be better understood from the following detailed description of a preferred illustrative and non-limiting embodiment, which is made in relation to the accompanying drawings, in which:

FIG. 1 is a sectional side view of a vehicle type light pick-up provided with two doors, the rear door being provided with a reverse opening system, the doors closing over one another, wherein the vehicle does not have B-pillar or side pillar;

FIGS. 2, 2A and 2B show a perspective view of the sealing arrangement singly mounted, out of the vehicle, as well as perspective views of the collector;

FIG. 3 is a side view of the vehicle rear door provided with the sealing arrangement according to the present invention;

FIG. 4 is a cross-section of the extruded profile, wherein the channels for conducting the collected water are shown, also acting in the door supporting and the system sealing; and FIGS. 5, 5A and 5B show a perspective view of the sealing arrangement singly mounted, out of the vehicle, as well as perspective views of the discharger.

DESCRIPTION OF A PREFERRED EMBODIMENT OF THE INVENTION

According to the above mentioned Figures, with (1) is indicated generally an automotive vehicle (partially shown in FIG. 1)—light pick-up type—defined by an engine compartment (5) (partially shown) and a cargo area (4) (partially shown), the vehicle necessarily having more than two doors. At least one side of the vehicle (1), defining the passenger compartment (6), has a front door (2) and a rear door (3), of the reversed or sliding type, so that between the doors (2) and (3) is not provided a structural pillar, the so-called B-pillar.

It is important to emphasize that, although the present description is made based on a light pick-up vehicle, the solution of the present invention is not limited to this type of vehicle, since it may also be applied to commercial vehicles or similar cargo vehicles, such as SUVs, trucks, commercial vans, sedans and hatchbacks, all not provided of B-pillar or swing rear doors such as minivans, light vans and luggage-van.

FIGS. 2 and 5 illustrate a sealing arrangement (10) according to the present Invention, which is intended to be fixed to the rear door (3) (see FIG. 3), for example, to a vehicle (1) reverse door. Said sealing arrangement (10) comprises a collector (11) that defines the upper region of the sealing arrangement, a discharger (12) that defines the bottom region of the sealing arrangement, being the collector and discharger interconnected by an extruded profile (13). According to the illustrated embodiment, the collector (11), the discharger (12) and the extruded profile (13) are separate components for reciprocal coupling; however, they could be formed in a single compact piece.

In particular, with regard to the collector (11) (see FIGS. 2A and 2B), it has a general conformation in a cup shape, defined by side walls (14) which partially circumscribe a slope (16) converging downwards. The collector (11) further comprises a structure (15), higher than the walls (14), which joins both wall (14) ends in a continuous manner and there is intended, in the sealing arrangement assembled condition, to define the finishing outer surface (outer in relation to the vehicle, as shown in FIG. 3). Moreover, the structure (15) is further capable of receiving a fastener button (17) (see FIG. 2A), in order to maintain the sealing arrangement (10) upper portion fixed in relation to the rear door (3).

Furthermore, the slope (16), extending downward, defines a mechanical coupling in the form of seat (18), said seat internally receiving the extruded profile (13). In particular, the extruded profile (13) coupling within the seat (18) puts in direct communication the inner of the collector (11) with one or more longitudinal cavities (22) of the extruded profile (13).

Said extruded profile (13) basically has a body (20) which is structurally defined by a core (21), preferably of metal or rigid polymer, and by at least one longitudinal cavity (22).

More particularly, the extruded profile (13) elongated body (20) has a basic conformation which is defined by the rear door (3) profile, on which the sealing arrangement (10) is fixed. In the illustrated embodiment (see FIGS. 2 and 3), as the rear door has an external bulging on its intermediate portion, the elongated body (20) is not perfectly straight and has a corresponding bulging.

On the other hand, if the vehicle (1) rear door does not have any bulging, the elongated body (20) would be perfectly straight.

The extruded profile (13) structure (see FIG. 4) is secured by a U-section shape core (21) made of rigid material, as opposed to the malleable material (preferably rubber) of the elongated body (20). As already mentioned, the core (21) may be made of metallic material or, possibly, of rigid polymeric material. Said elongated body (20) further defines at least one longitudinal cavity (22) (two cavities are illustrated in the described embodiment), whose lumen is upperly open towards the interior of the collector (11). Furthermore, the U cross-section core (21) defines an elongated seat (23) for engaging the elongated body (20) into the vehicle (1) rear door (3).

The extruded profile (13) bottom portion is engaged to the discharger (12), in particular to its respective seat (25), so as to interconnect the longitudinal cavity (22) lumen to the inside volume of the discharger (12). In particular, said inside volume of the discharger (12) is partially defined by a shaped plate (26) (see FIGS. 5A and 5B) and partially by the rear door (3) front surface, on which said shaped plate (26) is fixed. The fixing of the shaped plate (26) on the rear door (3) front surface can be carried out, for example, by means of fastener buttons (27) or, possibly, by means of screws, tape or glue.

Furthermore, the shaped plate (26) has an L-section shape and preferably divergent in the downward direction, so as not to obstruct the passage and exit of dust and water. In the case, for example, of a rear door (3) with basically flat front surface, the shaped plate could have an U-section shape, so as to allows a perfect coupling of the shaped plate (26) to the rear door (3) front surface.

Said volume also has an opening at its bottom end so as to allow the flow of dust, water and the like, which are received by the collector (11), transferred and directed though inside of the elongated body (20) and then discharged through the bottom opening of the discharger (12).

As described, the entire sealing arrangement (10) perfectly follows the rear door (3) geometry on which it is mounted. The water is collected at the upper portion by the collector (11), formed by a rubber molding and whose cup shape enables said collection, directing the water to the channels provided in the sealing arrangement central portion, named extruded profile, and then conducted it up to the bottom portion or discharger (12), also formed by rubber molding, which in turn drives the collected water out of the vehicle (1) compartment (6). The sealing arrangement assembly, mounted on the vehicle door, has perfect engagement to the vehicle door structure. Without distinction, the fasteners can be one-stage buttons (17, 27), screws, self-adhesive double-sided tape or even glue. Concerning to the rubber extruded central portion or extruded profile (13), it has geometry and external cavity such as to allow it to be embedded into the vehicle door (3).

More particularly, the vertical sealing arrangement between doors without side pillar or B-pillar, for cargo automotive vehicle or other types, such as pick-up trucks, trucks, SUVs, sedans, hatchbacks and the like, consists of two rubber moldings, the top collector and the bottom discharger, interconnected by an extruded profile, said extruded profile having at least one hollow longitudinal cavity whose lumen interconnects the inside volume of the collector to the inside volume of the discharger, thereby defining a path for the water and dust runoff from the upper part of the vehicle to the lower part of the vehicle. Said top collector (11) has a rectangular cross-section cup shape with convergent side walls and an open communicating bottom engageable to said extruded profile (13). The said bottom discharger (12) has the form of a shaped plate (26) and is provided in its upper part with a seat for engagement with the extruded profile. Said extruded profile has a longitudinal conformation following the door side profile in which said profile it is installed, and said extruded profile comprises an U cross section rigid core, from which sideways protrudes the said at least one hollow longitudinal cavity.

Furthermore, the upper and bottom moldings are fixed on the doors by screws or pins, whenever said rear door is reverse (3) or sliding, i.e., there is no B-pillar provided between the doors.

As can be realized from the above description, the solution herein proposed allows a substantial improvement both to the compartment sealing and no infiltration of water, and consequently dust, in a vehicle that does not have the side pillar.

Moreover, the proposed solution is very versatile, since said at least one longitudinal cavity of said longitudinal profile lends itself both to define an inner and restricted path for the flow of water and dust that may be deposited on the car compartment bonnet, in particular near the side on which the two doors confront each other and define a deformable elastomeric element that prevents the infiltration of water and dust in the portion defined between said vehicle doors. Preferably, the sealing arrangement is fixed on the rear door front side, of reverse or sliding door, while the longitudinal extruded profile defines two longitudinal cavities, parallel and adjacent to each other.

The invention claimed is:

1. A vertical sealing arrangement between doors without side pillar or B-pillar for an automotive vehicle (1), wherein said sealing arrangement (10) is formed of two moldings, namely top collector (11) and bottom discharger (12), both interconnected by an extruded profile (13), said extruded profile having at least one hollow longitudinal cavity (22) whose lumen interconnects the inside volume of the collector (11) to the inside volume of the discharger (12), thereby defining a path for the flow of the deposited water and dust from the upper portion of the vehicle (1) to the bottom portion of the vehicle.

2. The vertical sealing arrangement according to claim 1, wherein said collector (11) has a rectangular cross-section cup shape, comprising converging side walls (14) and a structure (15) and circumscribing a slope (16) and defining an open communicating bottom engageable to said extruded profile (13) by means of a seat (18).

3. The vertical sealing arrangement according to claim 1, wherein said discharger (12) has the form of a shaped plate (26), complementary to, and defining, with the rear door (3) front wall, a volume, and wherein said discharger (12) is provided, on its upper portion, with a seat (25) which engages the extruded profile (13).

4. The vertical sealing arrangement according to claim 1, wherein said doors have a side profile and said extruded profile (13) has a longitudinal conformation following the door (3) side profile of on which said profile is mounted and said extruded profile (13) comprises a elongated body (20) structured by an U cross-section rigid core (21), said elongated body (20) further comprising at least one hollow longitudinal cavity (22).

5. The vertical sealing arrangement according to claim 1, wherein the inside volume of the collector (11), in the converging funnel shape, the extruded profile (13) longitudinal cavity (22) lumen and the divergent inside volume of the discharger (12) define an open and continuous path for the flow of water, dust and other particulate matter.

6. The vertical sealing arrangement according to claim 1, wherein said collector (11) and said discharger (12) are mounted on the door (3) using buttons (17, 27) with pins or by means of screws.

7. The vertical sealing arrangement according to claim 1, wherein said extruded profile (13) is mounted on a rear door (3) of the vehicle (1) by means of a rigid U-shaped member (21) and an elongated seat (23).

8. An automotive vehicle (1), lacking a structural pillar between front and rear doors and comprising engine compartment (5), cargo compartment (4) and passenger compartment (6), at least one of the passenger compartment sides having a front door (2) and a rear door (3), wherein the automotive vehicle further comprises a vertical sealing arrangement (10) wherein said vertical sealing arrangement (10) is formed of two moldings, namely top collector (11) and bottom discharger (12), both interconnected by an extruded profile (13), said extruded profile having at least one hollow longitudinal cavity (22) whose lumen interconnects the inside volume of the collector (11) to the inside volume of the discharger (12), thereby defining a path for the flow of the deposited water and dust from the upper portion of the vehicle (1) to the bottom portion of the vehicle.

9. The vertical sealing arrangement according to claim 2, wherein the inside volume of the collector (11), in the converging funnel shape, the extruded profile (13) longitudinal cavity (22), lumen and the divergent inside volume of the discharger (12) define an open and continuous path for the flow of water, dust and particulate matter.

10. The vertical sealing arrangement according to claim 3, wherein the inside volume of the collector (11), in the converging funnel shape, the extruded profile (13) longitudinal cavity (22) lumen and the divergent inside volume of the discharger (12) define an open and continuous path for the POW of water, dust and particulate matter.

11. The vertical sealing arrangement according to claim 2, wherein said collector (11) and said discharger (12) are mounted on the door (3), using buttons (17, 27) with pins or by means of screws.

12. The vertical sealing arrangement according to claim 3, wherein said collector (11) and said discharger (12) are mounted on the door (3) using buttons (17, 27) with pins or by means of screws.

13. The vertical sealing arrangement according to claim 4, wherein said extruded profile (13) is fixed on a rear door (3) of the vehicle (1) by means of a rigid U-shaped member (21) and an elongated seat (23).

14. An automotive vehicle (1) as claimed in claim 8, wherein the collector (11) in said vertical sealing arrangement (10) has a rectangular cross-section cup shape, comprising converging side walls (14) and a structure (15) and circumscribing a slope (16) and defining an open communicating bottom engageable to said extruded profile (13) by means of a seat (18).

15. An automotive vehicle (1), as claimed in claim 8, wherein the vertical sealing arrangement (10) is one wherein said discharger (12) has the form of a shaped plate (26), complementary to, and defining, with the rear door (3) front wall, a volume, and wherein said discharger (12) is provided, on its upper portion, with a seat (25) which engages the extruded profile (13).

16. An automotive vehicle (1) as claimed in claim 8, wherein said doors have a side profile and said extruded profile (13) of the vertical sealing arrangement (10) has a longitudinal conformation following the door (3) side profile of on which said profile is mounted and said extruded profile (13) comprises a elongated body (20) structured by an U cross-section rigid core (21), said elongated body (20) further comprising at least one hollow longitudinal cavity (22).

17. An automotive vehicle (1), as claimed in claim 8 wherein the vertical sealing arrangement (10) according to claim 5 is one wherein the inside volume of the collector (11), in the converging funnel shape, the extruded profile (13) longitudinal cavity (22) lumen and the divergent inside volume of the discharger (12) define an open and continuous path for the flow of water, dust and other particulate matter.

18. An automotive vehicle (1), wherein the vertical sealing arrangement (10) is one wherein said collector (11) and said discharger (12) are mounted on the door (3) using buttons (17, 27) with pins or by means of screws.

19. An automotive vehicle (1) as claimed in claim 8, wherein the vertical sealing arrangement (10) is one wherein said extruded profile (13) is mounted on rear door (3) of the vehicle (1) by means of a rigid U-shaped member (21) and an elongated seat (23).

* * * * *